US006931246B2

(12) United States Patent
Iwatani et al.

(10) Patent No.: US 6,931,246 B2
(45) Date of Patent: Aug. 16, 2005

(54) LINE COUPLING STRUCTURE, MIXER, AND RECEIVING/TRANSMITTING APPARATUS COMPRISED OF SUSPENDED LINE AND DIELECTRIC WAVEGUIDE

(75) Inventors: Hidetoshi Iwatani, Ota (JP); Sadao Yamashita, Kyoto (JP)

(73) Assignee: Murata Manufacturing Co., Ltd., Kyoto (JP)

(*) Notice: Subject to any disclaimer, the term of this patent is extended or adjusted under 35 U.S.C. 154(b) by 51 days.

(21) Appl. No.: 10/314,270

(22) Filed: Dec. 9, 2002

(65) Prior Publication Data

US 2003/0119471 A1 Jun. 26, 2003

(30) Foreign Application Priority Data

Dec. 18, 2001 (JP) ....................................... 2001-384878

(51) Int. Cl.[7] .............................. H04Q 7/20; H01P 3/16
(52) U.S. Cl. ....................... 455/326; 455/327; 455/328; 455/330; 333/250
(58) Field of Search ................................ 455/326, 327, 455/328, 330; 333/239, 250

(56) References Cited

U.S. PATENT DOCUMENTS

| | | | | |
|---|---|---|---|---|
| 5,872,485 A | * | 2/1999 | Ishikawa et al. | 330/286 |
| 5,970,401 A | * | 10/1999 | Nishida et al. | 455/326 |
| 5,987,315 A | * | 11/1999 | Nishida | 455/327 |

FOREIGN PATENT DOCUMENTS

| | | |
|---|---|---|
| EP | 0 821 427 A1 | 1/1998 |
| EP | 0 827 269 A1 | 3/1998 |
| EP | 0 926 760 A1 | 6/1999 |
| JP | 10-075109 | 3/1998 |
| JP | 2001-016003 | 1/2001 |

OTHER PUBLICATIONS

Wu, et al.: "Hybrid Integration Technology of Planar Circuits and NRD–Guide for Cost Effective Microwave and Millimeter–Wave Applications"; IEEE Transactions on Microwave Theory and Techniques, IEEE Inc. New York; US; vol. 45; No. 6; Jun. 1997; pp. 946–953.
AP Futoshi Kuroki et al., "Nonradiative Dielectric Waveguide Circuit Components Using Beam–Lead Diodes", C–1 vol. J73–C–I No. 2, pp. 71–76, Feb. 1989.

* cited by examiner

*Primary Examiner*—Benny Lee
(74) *Attorney, Agent, or Firm*—Keating & Bennett, LLP

(57) ABSTRACT

A line coupling structure for coupling a dielectric waveguide to a suspended line has the dielectric waveguide including dielectric strips and two conductor plates that are approximately parallel to each other, the dielectric strips and a circuit board being sandwiched between the conductor plates. The line coupling structure also has the suspended line including the conductor plates and a conductor pattern on the circuit board. The conductor pattern is arranged in a direction that is substantially perpendicular to the dielectric strips. A protruding conductor pattern that extends in the extending direction of the dielectric strips is provided at a crossing position of the conductor pattern and the dielectric strips.

18 Claims, 6 Drawing Sheets

LINE COUPLING STRUCTURE, MIXER, AND RECEIVING/TRANSMITTING APPARATUS COMPRISED OF SUSPENDED LINE AND DIELECTRIC WAVEGUIDE

BACKGROUND OF THE INVENTION

1. Field of the Invention

The present invention relates to a line coupling structure for coupling a dielectric waveguide, in which signals such as millimeter waves propagate, to a suspended line. The present invention also relates to a mixer including such a line coupling structure and further relates to a receiving/transmitting apparatus including such a mixer.

2. Description of the Related Art

A diode mounting structure in a nonradiative dielectric waveguide (hereinafter referred to as an NRD waveguide) and a mixer with such a structure are disclosed in Kuroki and Yoneyama "Circuit Elements In Nonradiative Dielectric Waveguide Using Beam Lead Diodes", Journal of IEICE (The Institute of Electronics, Information and Communication Engineers), C-I, Vol J-73-C-I, No. 2, pp. 71–76 (February 1989).

This mixer has a structure in which a coupler includes an NRD waveguide, and a circuit board carrying a diode is vertically sandwiched between dielectric strips to couple the diode to the NRD waveguide.

However, the structure disclosed in the above-described document has various problems. Specifically, since the circuit board carrying the diode is arranged in a direction that is perpendicular to the lengthwise direction of the dielectric strips, it is difficult to have the circuit board be fixed and it tends to tilt, which makes it difficult to mount. Insertion of a sheet having a high dielectric constant into the NRD waveguide, providing a gap therein, or other measures are required to achieve matching in the structure, and therefore, the above-described structure cannot be easily designed and fabricated. In a coupler including the NRD waveguide, the greater the difference from the frequency at which the power distribution ratio is even, the higher the possibility that the power distribution ratio lacks balance.

In Japanese Unexamined Patent Application Publication No. 10-75109, a mixer having a line coupling structure for coupling a dielectric waveguide to a suspended line is disclosed. A typical mixer disclosed in the above-described publication is shown in FIG. 6. FIG. 6 is a plan view showing the dielectric waveguide apparatus when an upper conductor plate is removed. A circuit board 4 and dielectric strips are sandwiched between two conductor plates including two parallel conductor planes (not shown in FIG. 6). A dielectric strip 3*b* in FIG. 6 is an upper dielectric strip disposed on the circuit board 4. Another dielectric strip facing the dielectric strip 3*b* is disposed beneath the circuit board 4. On the circuit board 4, a conductor pattern 5 having open stubs 6*a*, 6*b*, 7*a*, and 7*b*, each having a length of about λ/4, is provided. A beam lead diode 8 is mounted on and connected in series with the conductor pattern 5. The dielectric strip 3*b* is arranged such that it crosses the conductor pattern 5 in a direction that is perpendicular to the conductor pattern 5 at a predetermined distance from the inner end thereof. The line coupling structure for coupling the suspended line including the conductor pattern 5 and the upper and lower conductor plates to a NRD waveguide including the dielectric strip 3*b* and the upper and lower conductor plates is formed in such a manner.

Since the dielectric waveguide apparatus described above has a structure in which LSM mode signals propagating in the dielectric waveguide have the same magnetic field direction as TEM mode signals propagating in the suspended line, the waveguide is easily and strongly coupled to the suspended line. Accordingly, this apparatus has various advantages including conversion loss in the mixer which can be less than that in known apparatuses, and the simplified structure of the overall apparatus allows for easy manufacturing.

However, the inventors of the present invention have discovered by experiment and determined that the transmission loss in a line coupling section between the dielectric waveguide and the suspended line can be further reduced.

SUMMARY OF THE INVENTION

In order to overcome the problems described above, preferred embodiments of the present invention provide a line coupling structure that has lower transmission loss between a dielectric waveguide and a suspended line, a mixer including such a line coupling structure, and a receiving/transmitting apparatus including such a mixer.

According to a preferred embodiment of the present invention, a line coupling structure has a dielectric waveguide that includes two conductor plates that are substantially parallel to each other and a dielectric strip, the dielectric strip and a circuit board being sandwiched between the two conductor plates, and a suspended line that includes the conductor plates and a conductor pattern on the circuit board. The conductor pattern and the dielectric strip are arranged so as to cross each other, thereby the dielectric waveguide and the suspended line are coupled each other. A protruding conductor pattern that extends in the extending direction of the dielectric strip is provided at a crossing position of the conductor pattern and the dielectric strip.

Such a structure allows the degree of coupling between the dielectric waveguide and the suspended line to increase, thereby achieving lower line conversion loss and reduced transmission loss between the dielectric waveguide and the suspended line.

In the line coupling structure, the tip of the protruding conductor pattern is preferably located close to the position where a signal propagating in the dielectric waveguide has the maximum electric field component. For example, when an LSM mode is used in the NRD waveguide, the maximum electric field component is obtained at a position that is slightly inside the dielectric strip from the inner end thereof. The provision of the tip of the protruding conductor pattern close to the position having the maximum electric field component maximizes the degree of coupling between the NRD waveguide and the suspended line. Such a structure can efficiently increase the degree of coupling between the dielectric waveguide and the suspended line.

According to another preferred embodiment of the present invention, a mixer including the line coupling structure according to the preferred embodiment described above. In the mixer, the dielectric strip and the conductor pattern are arranged, a diode is mounted on the conductor pattern, and an IF (intermediate frequency) signal is extracted from the conductor pattern, such that at least one of an RF (radio frequency) signal, a LO signal, and a mixed signal of the RF signal and the LO signal propagates in the suspended line. The mixer with such a structure can provide higher conversion efficiency.

According to a third preferred embodiment of the present invention, a receiving/transmitting apparatus includes a converter that converts a received signal into an IF signal. The mixer according to the preferred embodiment described above includes the converter. With this structure, it is possible to increase the signal-to-noise (SN) ratio of the IF signal and to obtain a detectable IF signal even when a weak signal is received, thereby increasing the available distance per unit of output power.

Other features, elements, characteristics and advantages of the present invention will become more apparent from the following detailed description of preferred embodiments thereof with reference to the attached drawings.

DETAILED DESCRIPTION OF PREFERRED EMBODIMENTS

The structure of a balanced mixer according to preferred embodiments of the present invention will now be described with reference to FIGS. 1 to 5.

Figure 1A:
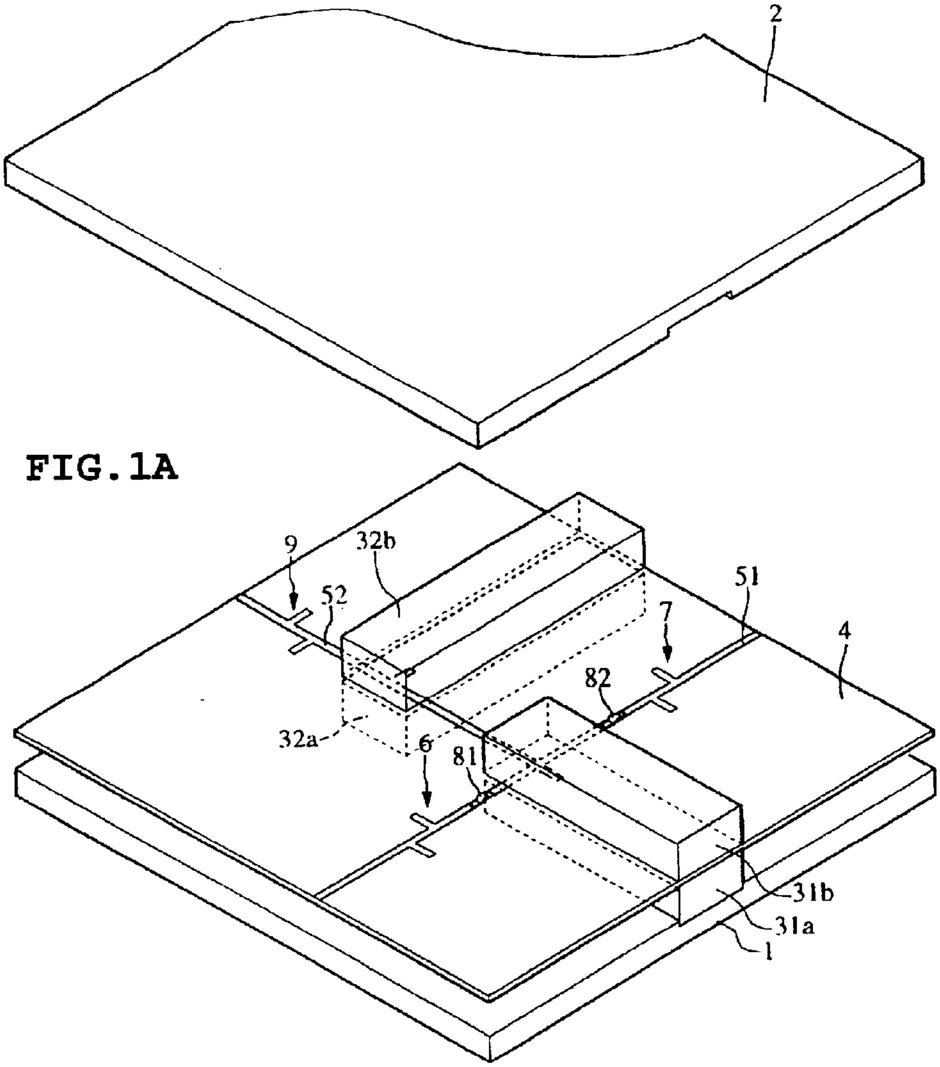
FIG. 1A is an exploded perspective view showing the structure of a balanced mixer according to a preferred embodiment of the present invention when an upper conductor plate is raised.
Figure 1B:
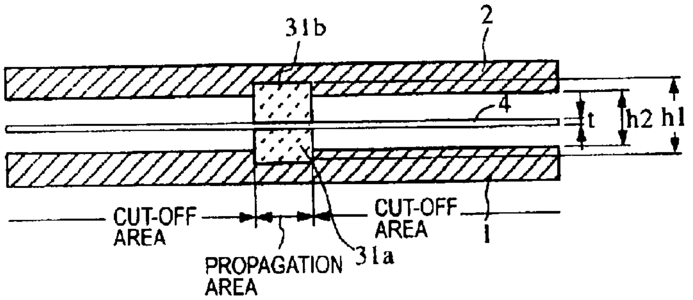
FIG. 1B is a sectional view showing the structure of the balanced mixer according to this preferred embodiment of the present invention.

FIG. 1A is an exploded perspective view showing the structure of a balanced mixer according to a preferred embodiment of the present invention when an upper conductor plate 2 is raised. FIG. 1B is a sectional view showing the structure of the balanced mixer according to this preferred embodiment. Referring to FIGS. 1A and 1B, a lower conductor plate 1 and the upper conductor plate 2 constitute two conductor planes arranged substantially parallel to each other one above the other. First dielectric strips 31*a* and 31*b* and second dielectric strips 32*a* and 32*b* (see FIG. 1A) are vertically sandwiched between the two conductor plates 1 and 2. A circuit board 4 is sandwiched between the first dielectric strips 31*a* and 31*b* and between the second dielectric strips 32*a* and 32*b*. The conductor plates 1 and 2 have corresponding grooves into which the first dielectric strips 31*a* and 31*b* and the second dielectric strips 32*a* and 32*b* fit. The circuit board 4, while being supported by a peripheral support (not shown), lies vertically halfway between, and substantially parallel to, the lower conductor plate 1 and the upper conductor plate 2. The conductor plates 1 and 2 are joined at their peripheries (not shown) and, in a dielectric waveguide, they constitute the two conductor planes arranged substantially parallel one above the other, as shown in FIGS. 1A and 1B.

The dielectric strips 31*a*, 31*b*, 32*a*, and 32*b* are preferably made of dielectric materials such as resin or ceramic and have a substantially rectangular cross-section that is substantially perpendicular to the lengthwise direction thereof. The dielectric strips 31*a*, 31*b*, 32*a*, and 32*b* constitute a propagation area where electromagnetic signals propagates therealong, in which area a cut-off state is cleared. The portions other than the dielectric strips 31*a*, 31*b*, 32*a*, and 32*b* constitute a cut-off area where the signals in the propagation area are cut off and where the distance between the conductor plates 1 and 2 is less than λ0/2, where λ0 is the free space wavelength of propagating high-frequency signals. The distance h1 between the conductor plates 1 and 2 in the cut-off area, the distance h2 therebetween in the propagation area, and the thickness t of the circuit board 4, which are shown in FIG. 1B, and the respective dielectric constants of the dielectric strips 31*a* and 31*b* and the circuit board 4 are determined such that the cut-off frequency in an LSM01 mode is lower than that in an LSEO1 mode in the propagation area and such that electromagnetic waves in the LSM01 and LSE01 modes are cut off in the cut-off area. In this manner, the first dielectric strips 31*a* and 31*b* and the upper and lower conductor plates 1 and 2 constitute a first NRD waveguide in which single-mode transmission in the LSM01 mode can be performed. The second dielectric strips 32*a* and 32*b* and the upper and lower conductor plates 1 and 2 constitute a second NRD waveguide in which single-mode transmission in the LSM01 mode can be performed.

Referring to FIG. 1A, on the upper surface of the circuit board 4, a first conductor pattern 51 is arranged substantially perpendicular to the lengthwise direction of the dielectric strips 31*a* and 31*b*. The first conductor pattern 51 and the upper and lower conductor plates 1 and 2 constitute a first suspended line. The first conductor pattern 51 has a first filter circuit 6 and a second filter circuit 7 at the both sides of the first dielectric strips 31*a* and 31*b* disposed therebetween. The suspended line between the first filter circuit 6 and the second filter circuit 7 defines a first resonant circuit. In the first resonant circuit, two beam lead diodes 81 and 82, which are Schottky barrier diodes, are mounted on and in series with the conductor pattern 51. A second conductor pattern 52 extends from the boundary of the first and second filter circuits 6 and 7 in the lengthwise direction of the first dielectric strips 31*a* and 31*b*. The second conductor pattern 52 and the upper and lower conductor plates 1 and 2 constitute a second suspended line. A third filter circuit 9 is provided in the middle of the second conductor pattern 52 so that some signals propagating in the second conductor pattern 52 do not go beyond the third filter circuit 9. The second NRD waveguide, which includes the second dielectric strips 32*a* and 32*b* and the upper and lower conductor plates 1 and 2, is magnetically coupled to the second conductor pattern 52.

Figure 2:
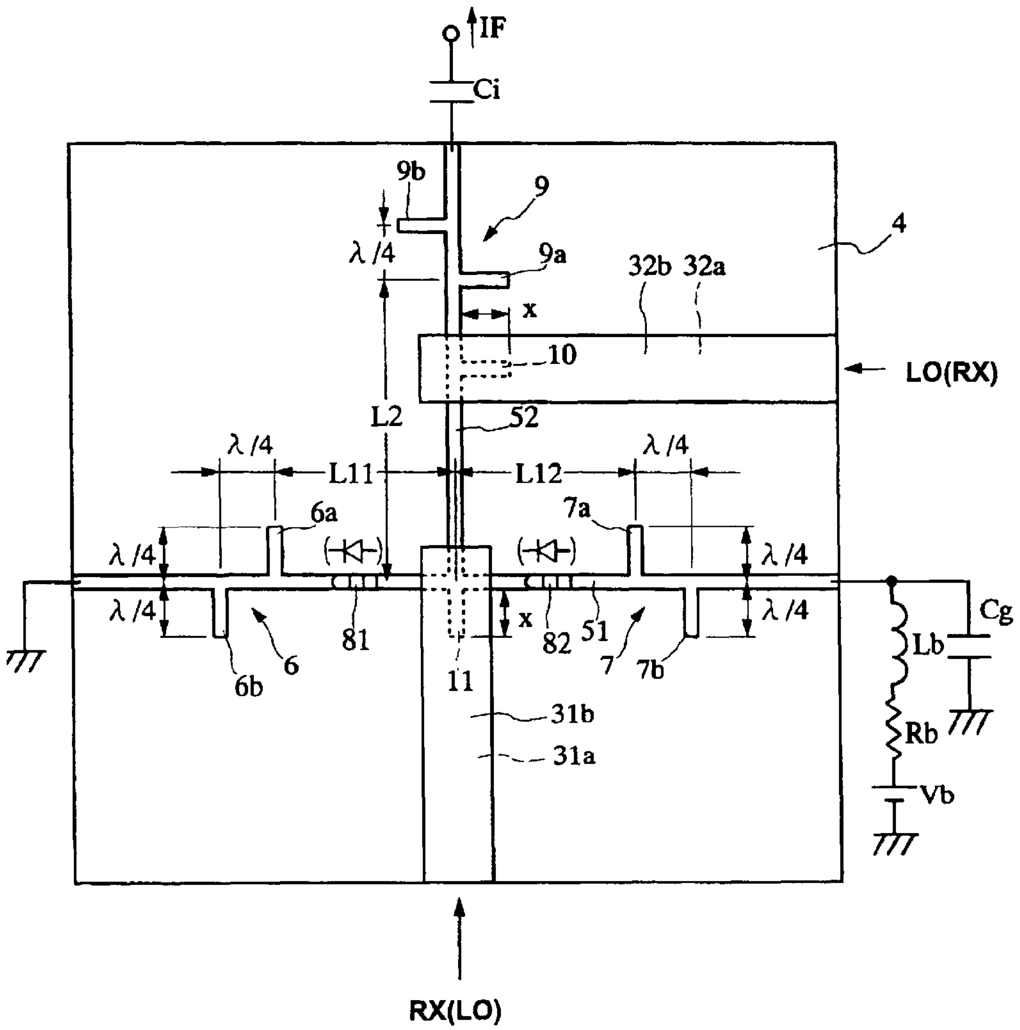
FIG. 2 is a plan view of the balanced mixer according to this preferred embodiment of the present invention, when the upper conductor plate is removed.

FIG. 2 is a plan view of the balanced mixer when the upper conductor plate 2 is removed. Open stubs 6*a*, 6*b*, 7*a*, 7*b*, 9*a*, and 9*b* have a length of about λ/4. The pair of open stubs 6*a* and 6*b*, 7*a* and 7*b*, and 9*a* and 9*b* are each arranged with a spacing of about λ/4 therebetween. Each pair of the λ/4-long open stubs at a spacing of about λ/4 defines a band elimination filter (BEF) for blocking signals with a wavelength of λ. The value of about λ/4 is determined in accordance with the effective dielectric constant of the line.

The electrical lengths of the distance L11 from the center of the first filter circuit 6, which is located at the open stud 6*a*, to the crossing point of the first conductor pattern 51 and the second conductor pattern 52, and the electrical length of the distance L12 from the center of the second filter circuit 7, which is located at the open stud 7*a*, to the crossing point of the first conductor pattern 51 and the second conductor pattern 52 correspond to an integral multiple of about ½ of the wavelength at the frequency f1 of millimeter waves propagating in the first NRD waveguide. Accordingly, the suspended line between the filter circuits 6 and 7 functions as a resonant circuit with two short-circuited ends. The electrical length of the distance L2 from the center portion between the first filter circuit 6 and the second filter circuit 7 to the open stub 9*a* of third filter circuit 9 is an integral multiple of about ½ of the wavelength at the frequency f2 of millimeter waves propagating in the second NRD waveguide including the second dielectric strips 32*a* and 32*b*. Since a frequency difference between the frequency f1 and the frequency f2 are generally small and the electrical lengths of the distances L11 and L12 are about ½ of the wavelengths, the center portion between the first filter circuit 6 and the second filter circuit 7 is equivalently short-circuited. Accordingly, the suspended line having the distance L2 also functions as a resonant circuit with two short-circuit ends.

In the first resonant circuit between the first and second filter circuits 6 and 7, the two beam lead diodes 81 and 82 are mounted on and in series with the conductor pattern 51. The LSM01 mode signals propagating in the first NRD waveguide including the first dielectric strips 31*a* and 31*b* and the upper and lower conductor plates 1 and 2 (not shown) easily couples with the TEM mode signals in the suspended line including the first resonant circuit. The relative arrangement between the first NRD waveguide and the suspended line, the positions of diodes 81 and 82, the positions of the filter circuits 6 and 7 and so on are determined such that the reflection loss from the inner end of the first NRD waveguide or the conversion loss in the mixer is minimized at a desired frequency (for example, f1).

The second conductor pattern 52 is magnetically coupled to the second NRD waveguide including the second dielectric strips 32*a* and 32*b* and the upper and lower conductor plates 1 and 2 (not shown). When a first RF signal (for example, a received signal RX) or a second RF signal (for example, a local signal LO) is inputted from the second NRD waveguide, the inputted signal is converted into a mode in the suspended line and is applied to two diodes 81 and 82 in the reverse phase.

A bias voltage supply circuit including an inductance coil Lb, a resistance Rb, and power source Vb is connected to the first conductor pattern 51. One end of the conductor pattern 51 is AC-grounded through a capacitor Cg. The inductance coil Lb prevents the leakage of an IF signal into the bias voltage supply circuit. The resistance Rb sets a bias current for the diodes to reduce conversion loss.

In this structure, the first and second RF signals from the second NRD waveguide are applied to the two diodes 81 and 82 at a phase difference of about 180°, so that the frequency components of the differences between the first and second RF signals entering from the second NRD waveguide and the second and first RF signals entering from the first NRD waveguide have reverse phases with respect to each other. Since the two diodes 81 and 82 are arranged to have opposite orientations with respect to each other when they are viewed from the IF end, the frequency components of the differences mentioned above can be combined in phase to be extracted as the IF signal through a capacitor Ci.

Referring to FIG. 2, on the upper surface of the circuit board 4, a protruding conductor pattern 11 extends from the crossing position of the first conductor pattern 51 and the first dielectric strips 31*a* and 31*b* and has a length x in the extending direction of the first dielectric strips 31*a* and 31*b*. A protruding conductor pattern 10 extends from the crossing position of the second conductor pattern 52 and the second dielectric strips 32*a* and 32*b* and has a length x in the extending direction of the second dielectric strips 32*a* and 32*b*.

The provision of the protruding conductor patterns 10 or 11 at the position having a higher electric field component in a main propagation mode in the NRD waveguide causes the degree of coupling between the suspended line and the dielectric waveguide to increase.

Figure 3:
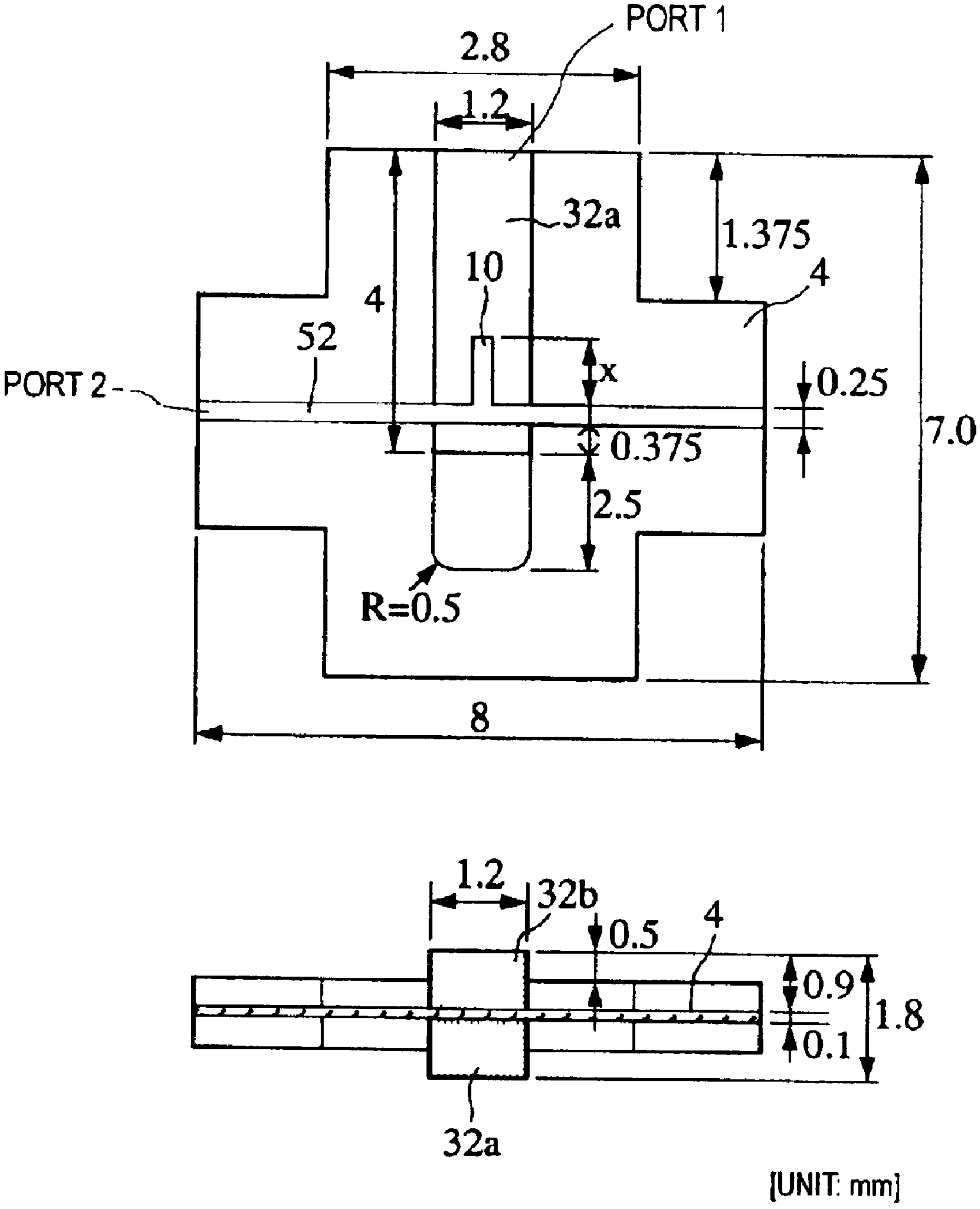
FIG. 3 shows an example of dimensions of a line conversion section included in the balanced mixer.
Figure 4:
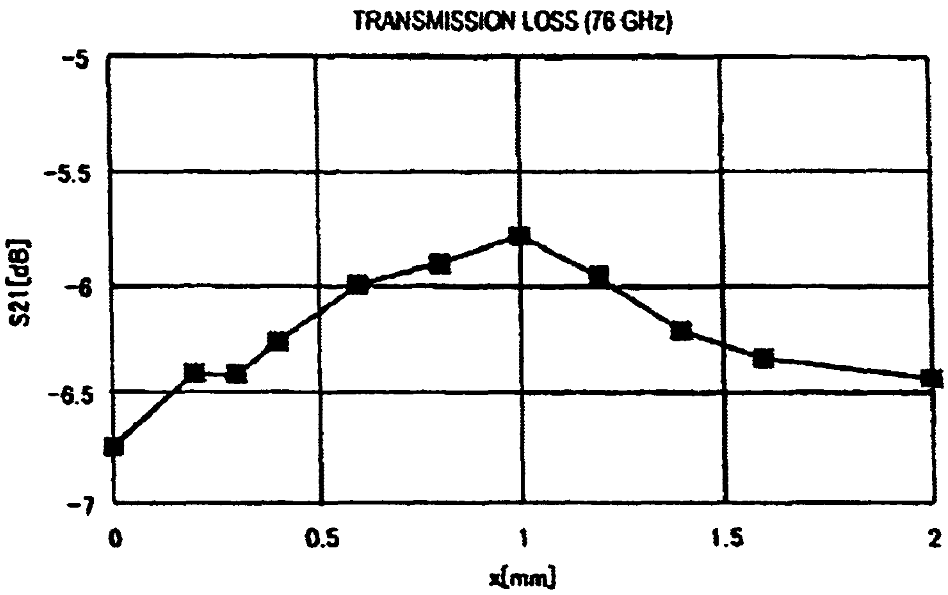
FIG. 4 is a graph showing the frequency characteristics of the transmission loss in the line conversion section.

FIG. 3 shows an example of dimensions for obtaining the characteristics of a line conversion section with respect to the second NRD waveguide having the second conductor pattern 52, including protruding conductor pattern 10, and the second dielectric strips 32*a* and 32*b* on the upper surface of the circuit board 4, as shown in FIG. 2. FIG. 4 is a graph showing the transmission loss in the line conversion section.

Referring to FIG. 3, the width of the cut-off area is determined in the second NRD waveguide including the second dielectric strips 32*a* and 32*b* and the upper and lower conductor plates 1 and 2 (not shown), using the second dielectric strips 32*a* and 32*b* having a relative dielectric constant (∈r) of about 2.04, with the inner ends of the dielectric strips being open. Similarly, the width of the suspended line is determined.

Referring to FIG. 4, the transmission loss (S parameter S21) between the outer end of the NRD waveguide (port 1) in the LSM01 mode and the outer end of the suspended line (port 2) in the TEM mode is calculated at a frequency of about 76 GHz by a FEM (finite element method) when the length x of the protruding conductor pattern in FIG. 3 is varied.

As shown in FIG. 4, when the length x of the protruding conductor pattern is increased from 0, the degree of coupling increases while the conversion loss in the line decreases. The degree of coupling reaches a maximum level at a certain length x.

As described above, when the inner end of the NRD waveguide is open, the electric field strength reaches a maximum at a position slightly inside the NRD waveguide from the inner end. In contrast, the suspended line has a maximum voltage at the open end. Accordingly, the highest degree of coupling is achieved when an open end of the suspended line is at the position where the NRD waveguide has the maximum electric field strength.

Although a three-terminal line conversion section is described, a four-terminal line conversion section with respect to the first NRD waveguide having the first conductor pattern 51 and the first dielectric strips 31*a* and 31*b* shown in FIG. 2 provides similar characteristics and similar effects.

Accordingly, the provision of the protruding conductor pattern allows the line conversion loss between the NRD waveguide and the suspended line to be decreased. Thus, with the balanced mixer, the conversion loss therein can be reduced over a larger bandwidth.

Although the balanced mixer is described in the present preferred embodiment, a single mixer can be provided. Specifically, referring to FIGS. 1A and 1B and 2, a mixed signal of the first RF signal and the second RF signal is inputted from the first NRD waveguide including the first dielectric strips 31*a* and 31*b*, without the second conductor pattern 52, the second dielectric strips 32*a* and 32*b*, and the diode 82 (without pattern gaps in the diode 82), and the IF signal is outputted from the conductor pattern 51.

Figure 5:
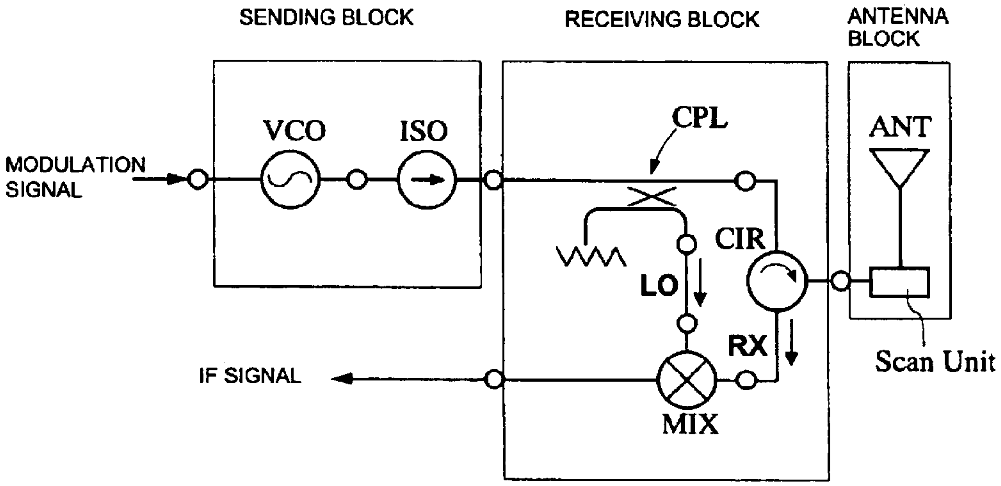
FIG. 5 is a block diagram showing the structure of a millimeter-wave radar module according to another preferred embodiment of the present invention.
Figure 6:
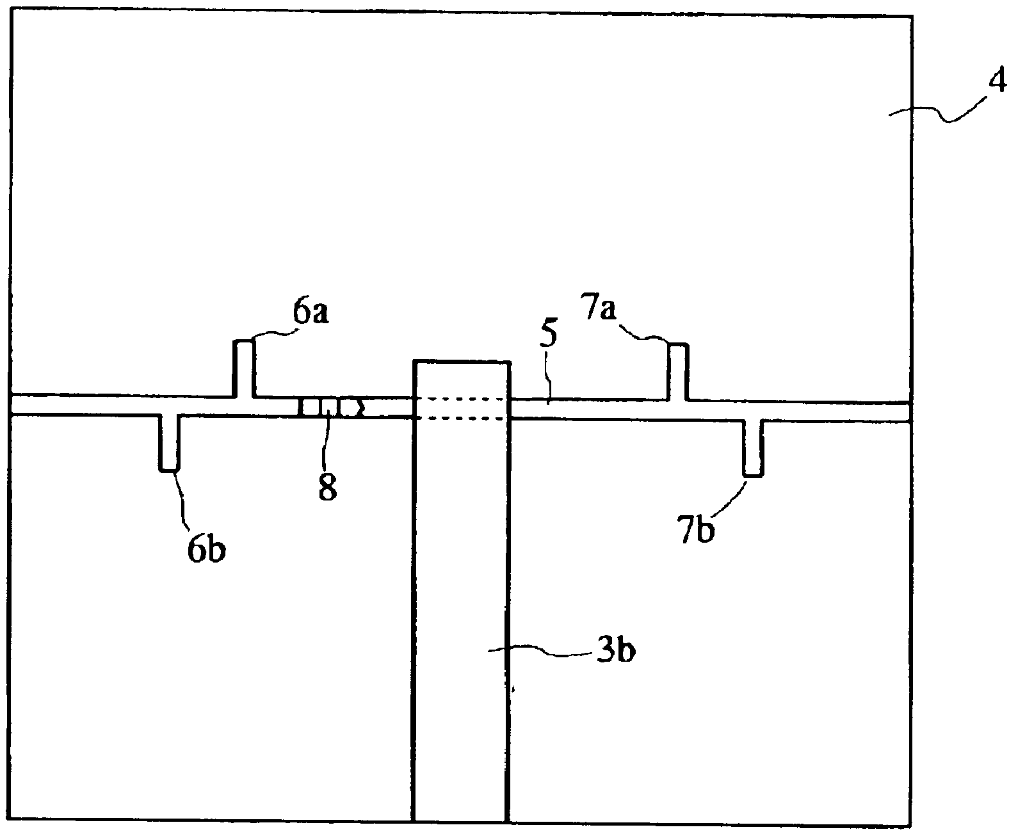
FIG. 6 PRIOR ART
FIG. 6 is a plan view showing the structure of a dielectric waveguide apparatus having a known prior art line coupling structure for a dielectric waveguide and a suspended line.

FIG. 5 shows a typical structure of a millimeter-wave radar module of a receiving/transmitting apparatus according to another preferred embodiment of the present invention.

A block diagram of the millimeter-wave radar module is shown in FIG. 5. A MODULATION SIGNAL is inputted into the SENDING BLOCK that includes a voltage controlled oscillator VCO and an isolator ISO. Referring to FIG. 5, a voltage controlled oscillator VCO uses, for example, a Gunn diode and a varactor diode. An isolator ISO prevents a reflected signal from returning to the VCO. The RECEIVING BLOCK, which includes a coupler CPL, a circulator CIR, and a mixer MIX, is connected to the SENDING BLOCK and to the ANTENNA BLOCK, which includes a scan unit and an antenna ANT. A coupler CPL is a directional coupler including a NRD waveguide for extracting a portion of a transmitter signal as the local signal LO. A circulator CIR provides the transmitter signal to a scan unit and transmits a receiver signal RX to a mixer MIX. The mixer MIX mixes the receiver signal RX and the local signal LO to output an IF signal. The mixer shown in FIGS. 1A and 1B and 2 defines the mixer MIX.

A millimeter-wave radar apparatus has the above-described millimeter-wave radar module and a control section for providing a modulation signal to calculate the relative distance and the relative speed of a target using the IF signal.

While preferred embodiments of the invention have been it is to be understood that variations and modifications will be apparent to those skilled in the art without departing the scope and spirit of the invention. The scope of the invention, therefore, is to be determined solely by the following claims.

What is claimed is:

1. A line coupling structure comprising:

a dielectric waveguide including a dielectric strip and two conductor plates that are substantially in parallel with each other, the dielectric strip and a circuit board being sandwiched between the two conductor plates, and the dielectric strip including an upper portion and a lower portion; and a suspended line including the conductor plates and conductor pattern on the circuit board, the conductor pattern and the dielectric strip being arranged so as to cross each other in order to be coupled with each other;

wherein a protruding conductor pattern that extends in the extending direction of the dielectric strip is provided at a crossing portion of the conductor pattern and the dielectric strip, such that the protruding conductor pattern is sandwiched between the upper portion and the lower portion of the dielectric strip along a major portion of the protruding conductor pattern.

2. The line coupling structure according to claim 1, wherein the tip of the protruding conductor pattern is located close to a position where a signal propagating in the dielectric waveguide has a maximum electric field component.

3. The line coupling structure according to claim 1, further comprising at least one additional dielectric strip, wherein the two conductor plates have corresponding grooves into which the at least one additional dielectric strip is mounted.

4. The line coupling structure according to claim 3, wherein the at least one additional dielectric strip has a substantially rectangular cross-section.

5. The line coupling structure according to claim 3, wherein the at least one additional dielectric strip constitutes a propagation area where electromagnetic signals propagate therealong.

6. The line coupling structure according to claim 3, wherein the dielectric strip and the two conductor plates define a first NRD waveguide; and the least one additional dielectric strip and the two conductor plates define a second NRD waveguide.

7. The line coupling structure according to claim 3, wherein at least one of the at least one additional dielectric strip and the conductor plates constitute an NRD waveguide.

8. The line coupling structure according to claim 3, wherein the suspended line is defined by an additional conductor pattern that is arranged substantially perpendicular to a lengthwise direction of the at least one additional dielectric strip.

9. The line coupling structure according to claim 1, wherein the conductor pattern includes at least one filter circuit.

10. The line coupling structure according to claim 1, wherein the dielectric strip and the two conductor plates constitute an NRD waveguide.

11. The line coupling structure according to claim 1, further comprising at least one additional suspended line.

12. The line coupling structure according to claim 1, wherein the conductor pattern includes open stubs having a length of about $\lambda/4$.

13. The line coupling structure according to claim 1, wherein the conductor pattern includes open stubs arranged at a spacing of about $\lambda/4$ therebetween.

14. The line coupling structure according to claim 1, wherein the conductor pattern includes open stubs arranged to define a band elimination filter.

15. The line coupling structure according to claim 1, wherein the suspended line defines a resonant circuit with two short-circuited ends.

16. A mixer comprising the line coupling structure according to claim 1, wherein the dielectric strip and the conductor pattern are arranged, a diode is mounted on the conductor pattern, and an intermediate frequency signal is extracted from the conductor pattern, such that at least one of a first radio frequency signal, a second radio frequency signal, and a mixed signal of the first radio frequency signal and the second radio frequency signal propagates in the suspended line.

17. The mixer according to claim 16, wherein the tip of the protruding conductor pattern is located close to a position where a signal propagating in the dielectric waveguide has a maximum electric field component.

18. A receiving/transmitting apparatus comprising a converter that converts a received signal into an intermediate frequency signal, the converter comprising the mixer according to claim 16.

* * * * *